(12) United States Patent
Held

(10) Patent No.: US 9,704,092 B2
(45) Date of Patent: Jul. 11, 2017

(54) SECURITY SEALING DEVICE COMPRISING A RFID TAG

(75) Inventor: Philippe Held, Corseaux (CH)

(73) Assignee: ASSA ABLOY AB (SE)

( * ) Notice: Subject to any disclaimer, the term of this patent is extended or adjusted under 35 U.S.C. 154(b) by 1182 days.

(21) Appl. No.: 11/741,629

(22) Filed: Apr. 27, 2007

(65) Prior Publication Data

US 2007/0222232 A1 Sep. 27, 2007

Related U.S. Application Data

(63) Continuation of application No. PCT/IB2005/025340, filed on Jul. 14, 2005.

(30) Foreign Application Priority Data

Oct. 28, 2004 (WO) ................ PCT/CH2004/000643

(51) Int. Cl.
| | | |
|---|---|---|
| G08B 13/14 | (2006.01) |
| G06K 19/077 | (2006.01) |
| G06K 19/073 | (2006.01) |
| G08B 13/24 | (2006.01) |
| G09F 3/00 | (2006.01) |
| G06K 17/00 | (2006.01) |

(52) U.S. Cl.
CPC ..... *G06K 19/07798* (2013.01); *G06K 19/073* (2013.01); *G06K 19/0775* (2013.01); *G06K 19/07749* (2013.01); *G06K 19/07758* (2013.01); *G08B 13/2417* (2013.01); *G08B 13/2434* (2013.01); *G08B 13/2448* (2013.01); *G09F 3/0292* (2013.01); *G06K 2017/0064* (2013.01); *Y10T 292/48* (2015.04)

(58) Field of Classification Search
CPC ........... G08B 13/2434; G06K 19/0723; G06K 19/073; G06K 19/04; G06K 19/07749; G06K 19/07718; G06K 19/02; G06K 19/717; G06K 19/739
USPC .......... 340/572.1–572.9, 539.26, 541, 568.1, 340/10.1, 571
See application file for complete search history.

(56) References Cited

U.S. PATENT DOCUMENTS

| | | | |
|---|---|---|---|
| 5,406,263 A * | 4/1995 | Tuttle ......................... 340/572.1 |
| 5,635,917 A * | 6/1997 | Todman .................... 340/825.37 |
| 6,050,622 A * | 4/2000 | Gustafson ................. 292/307 R |
| 6,888,502 B2 * | 5/2005 | Beigel et al. .......... 343/700 MS |

(Continued)

FOREIGN PATENT DOCUMENTS

| | | |
|---|---|---|
| DE | 20110585 | 11/2001 |
| WO | WO 93/12513 | 6/1993 |
| WO | WO 01/69524 | 9/2001 |

OTHER PUBLICATIONS

PCT International Search Report for International Patent Application No. PCT/IB2005/052340, Oct. 25, 2005, 4 pages.

(Continued)

*Primary Examiner* — Hoi Lau
(74) *Attorney, Agent, or Firm* — Sheridan Ross P.C.

(57) ABSTRACT

The invention concerns a security sealing device including a sealing element, an integrated circuit and an antenna connected to the integrated circuit, the integrated circuit and the antenna forming a RFID circuit. The security sealing device is characterized by the fact that said sealing element is conductive and is forming a part of said antenna.

13 Claims, 4 Drawing Sheets

(56) References Cited

U.S. PATENT DOCUMENTS

| | | | |
|---|---|---|---|
| 7,034,689 B2* | 4/2006 | Teplitxky | B65D 55/06 |
| | | | 340/572.1 |
| 7,084,825 B2* | 8/2006 | Sakae et al. | 343/788 |
| 7,098,792 B1* | 8/2006 | Ahlf et al. | 340/568.1 |
| 2002/0021208 A1* | 2/2002 | Nicholson | G06K 7/0008 |
| | | | 340/10.34 |
| 2002/0024439 A1* | 2/2002 | Kawai et al. | 340/572.1 |
| 2002/0067264 A1* | 6/2002 | Soehnlen | 340/572.1 |
| 2004/0066296 A1* | 4/2004 | Atherton | 340/572.1 |
| 2004/0119593 A1* | 6/2004 | Kuhns | 340/572.7 |
| 2005/0242950 A1* | 11/2005 | Lindsay et al. | 340/539.26 |
| 2006/0055531 A1* | 3/2006 | Cook | B60C 23/0408 |
| | | | 340/539.22 |

OTHER PUBLICATIONS

PCT Written Opinion of the International Searching Authority for International Patent Application No. PCT/IB2005/052340, Oct. 25, 2005, 5 pages.

\* cited by examiner

SECURITY SEALING DEVICE COMPRISING A RFID TAG

FIELD OF THE INVENTION

The present invention relates to security sealing devices, which comprise a tamper-evident element consisting of a Radio Frequency Identity (RFID) tag.

BACKGROUND

On numerous occasions it is necessary to ensure that an item is securely identified, securely meaning that the identification means cannot be removed from the item and used for another item without evidence of tampering.

For application in retail of expensive goods, such as jewelleries, watches, and precious stones, a secure and unique identification is more and more requested to avoid fraud in the selling shop and in the supply chain from manufacturers to the end customer (buyers).

In many occasions it is needed to guaranty that the content of an object, e.g. a container, has not been fraudulently modified during a storage period or at any point along the supply chain since the sealing was affixed to the container.

The term "container" used in the present text has a broad meaning. It may be a building of which the door or the windows has been sealed, a box which content must not be altered or an electrical/water counter that must be opened only by authorised persons.

The term "sealing" is also used in a very general manner in the present text. It is not limited to the sealing of an object like a box but encompasses also the sealing of the security object itself. An example of this second definition is an operation of marking an object, like for example a suitcase during a trip, the marking having to remain attached to the object without a possibility of being taken off it, exchanged or altered before the end of the trip, or before the accomplishment of a checking operation, respectively.

There are many different types of sealing devices existing in today's market. These sealing devices are used in many applications such as, security seal for postal bags, security boxes, doors, and containers etc. The existing sealing devices are usually identified with various methods, like barcode, engraved serial number or even RFID tags. Those means of identification provide no direct evidence in the event of tampering with the sealing device other than by a visual check.

International patent application WO 93/12513 discloses a security-sealing device made of a support on which is fixed an electronic circuit comprising an antenna connected to a chip. Any attempt to peel or tear off the support would break the electronic circuit and prevents it from sending out its code when read by an external detecting device such as an RFID reader.

The above cited prior art security sealing device is efficient. There is, however, some disadvantages related to this type of device. For instance, if by any means the support is detached, e.g. unglued, from the electronic circuit without damaging the wire loop inside, the tag would still be functional, and therefore would not provide any electronic tamper evidence.

There is therefore a need to improve the tamper evidence of such security sealing devices.

SUMMARY

The previous cited problems are solved with the object of the present invention which is characterized by the fact that, contrary to the prior art device disclosed in WO 93/12513, the antenna itself is designed to constitute the sealing element. The sealing part of the object according to embodiments of the present invention can be made of a conductive band made of a single conductive material or, more simply, the sealing part may consist of an isolated conductive wire.

This gives much more flexibility when applying the object according to embodiments of the invention on the item to seal or securely identify it, because the length of the sealing part can be on site adapted to the size of the item or its sealing points location. With embodiments of the present invention very small items can be sealed and securely identify as the isolated wire, used as sealing band, can be very small like 0.5 mm diameter, still considering some need for mechanical strength of the sealing.

With embodiments of the present invention, the design of the antenna and the sealing band or wire, has a positive effect on the reading/writing performance of the tag itself. The bigger loop made with the sealing part when connected to the tag increases the equivalent surface area of the tag antenna crossed by the magnetic field generated from the RFID reader, and therefore increases the reading/writing performance. This positive effect is not possible with the prior art device disclosed WO 93/12513.

BRIEF DESCRIPTION OF THE DRAWINGS

The invention will be better understood in the text below together with the following drawings.

LIST OF NUMERICAL REFERENCES

Figure 1:
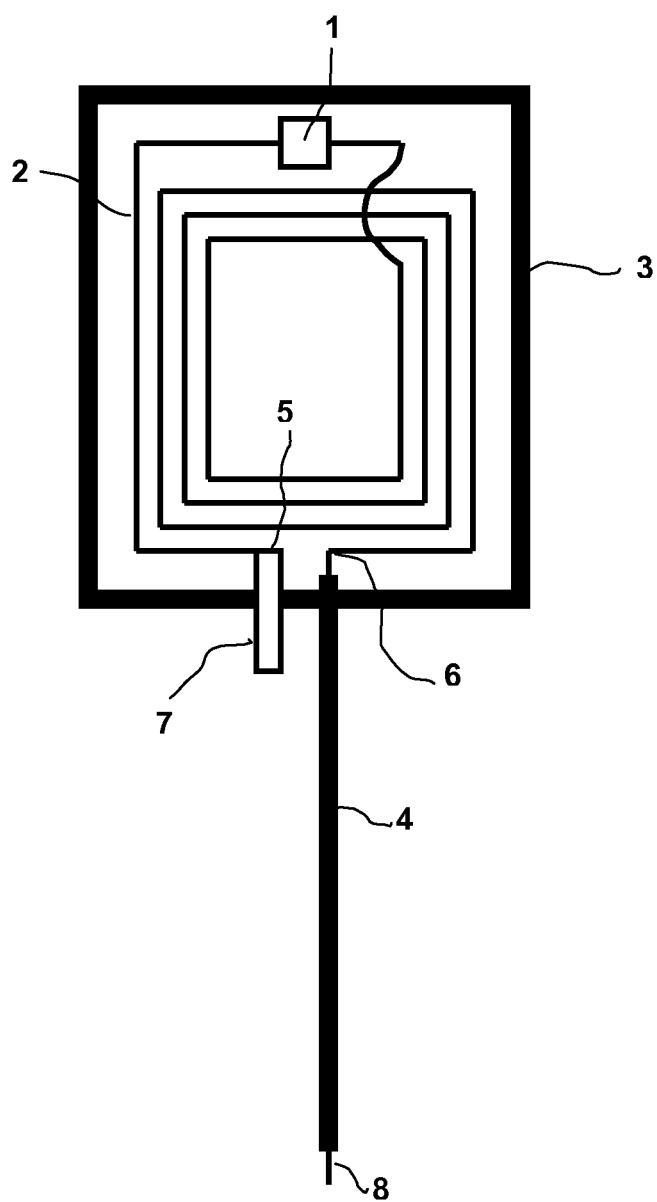
FIG. 1 shows a first embodiment of a device according to the invention.

1 IC
2 Partial antenna
3 Housing
4 Conductive sealing element
5 First connecting point
6 Second connecting point
7 Connector
8 Sealing element free end
9 Additional RFID circuit
10 Visual tamper-evident element
11 Mechanical tamper-evident element
12 Electronic module

DETAILED DESCRIPTION OF THE INVENTION

The embodiment shown in FIG. 1 comprises a housing 3 containing an electronic module made of an IC 1 connected to a partial antenna 2. The partial antenna 2 is a conductive path, which is interrupted on two points 5,6. A connector 7 is fixed to the first connecting point 5 and one end of a conductive sealing element 4 is connected to the second connecting point 6.

The conductive sealing element 4 may be a conductive band, a conductive wire held in an isolated sheath or any similar conductive element. This element has a double function, i.e. a sealing and conductive function. The sealing element free end 8 is adapted to be secured to the connector 7 after the sealing element 4 has been placed on the item. If the sealing element 4 is a band, it can be flexible or semi-rigid.

The electronic module previously defined is totally sealed in the housing 3, this latter one being made of any suitable material, e.g. plastic or metal.

When the sealing element free end 8 is secured in the connector 7, the RFID circuit made of the IC 1, the partial antenna 2 and the sealing element 4 is closed. In this configuration the security-sealing device is in a functional mode. Any attempt to separate the sealing element 4 from the housing 3 would break the RFID circuit and prevents it from sending out its code when read by an external detecting device such as an RFID reader.

The connector 7 is made of a conductive sleeve and/or an electrically insulating material. After being separated from the connector 7, the sealing element 4 cannot be re-connected without leaving an obvious visible or electronic tamper-evident proof.

The sealing element 4 can be fixed to the housing 3 by any means known in the art, e.g. plugging, gluing, etc.

Figure 2:
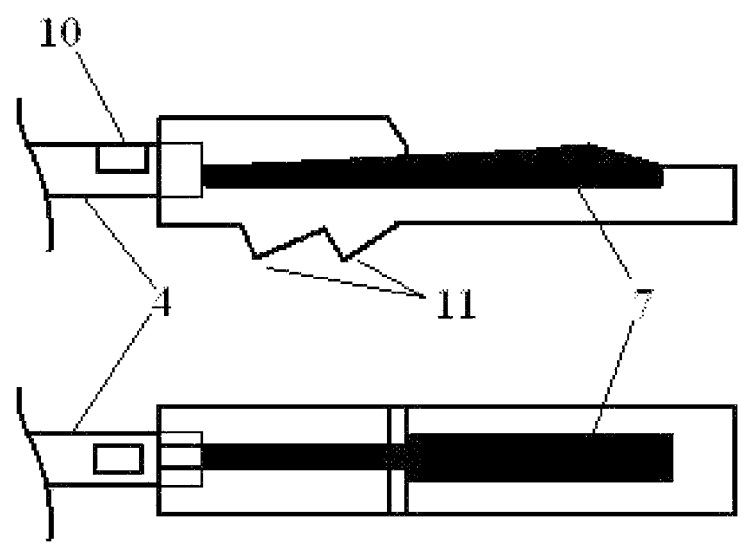
FIG. 2 shows an embodiment of a connector which can be used with the embodiments depicted in FIG. 1.

FIG. 2 shows an example of a connector 7 made of conductive part housed in a plastic sleeve, the connector 7 having the functions of being inserted into the housing 3 so as to make electrical contact with the first connecting point 5 and being affixed to the housing 3. The sleeve furthermore includes mechanical tamper-evident elements 11 designed so that the connector cannot be removed without damaging either the connector 7 and/or the housing 3 thus providing evidence of tampering. Alternatively or in addition those elements 11 are also acting as locking system to ensure a proper fixation of the sealing element 4 to the housing 3.

One interesting advantage of the device according to the present invention should be pointed out at this stage: The electronic module can be re-used (recycled) after the device is disassembled. As already mentioned, disassembly destroys the functionality the sealing element 4 and, often, the housing 3, but not the electronic module.

Figure 3:
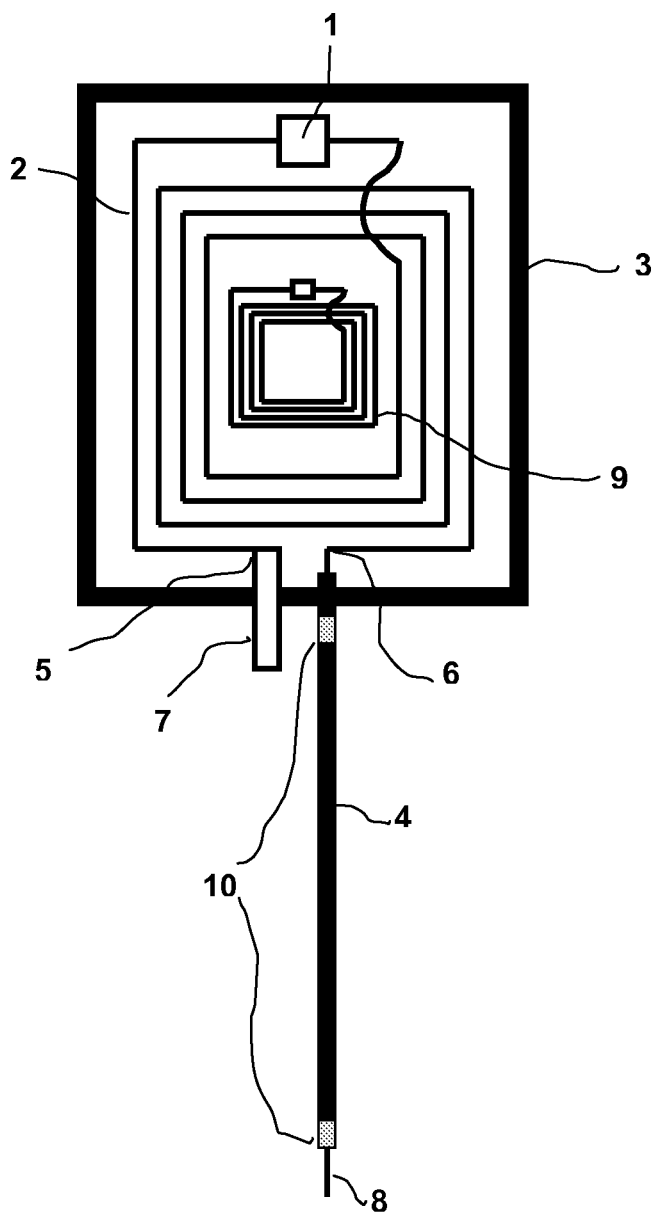
FIG. 3 shows a second embodiment of a device according to the invention.

To add a visual and second level of tamper proof evidence to the electronic tamper proof evidence itself, and to make after tampering any repair of the conductive band or wire not possible without leaving a visual tamperproof evidence, other visual security means can be added on both extremity, such as micro UV dots or hologram micro dots for example. FIG. 3 shows another embodiment of the invention, which includes such visual tamper-evident elements 10 situated on the sealing element 4. Those visual elements can also be situated on the housing 3. Visual tamper-evident elements are known as such, they can consist of security inks, micro particles, adhesives or films.

The device shown in FIG. 3 also includes as optional feature, one additional RFID circuits placed in the middle. The additional RFID circuit, made of an antenna connected to a RFID integrated circuit, is programmed to keep any kind of information that needs to be memorized permanently in the memory of the RFID IC. The additional RFID circuit adds a second level of permanent authentication and emphasize a higher security level to avoid any risk of counterfeiting. More additional RFID can be used and can be place inside or outside the primary circuit.

Figure 4:
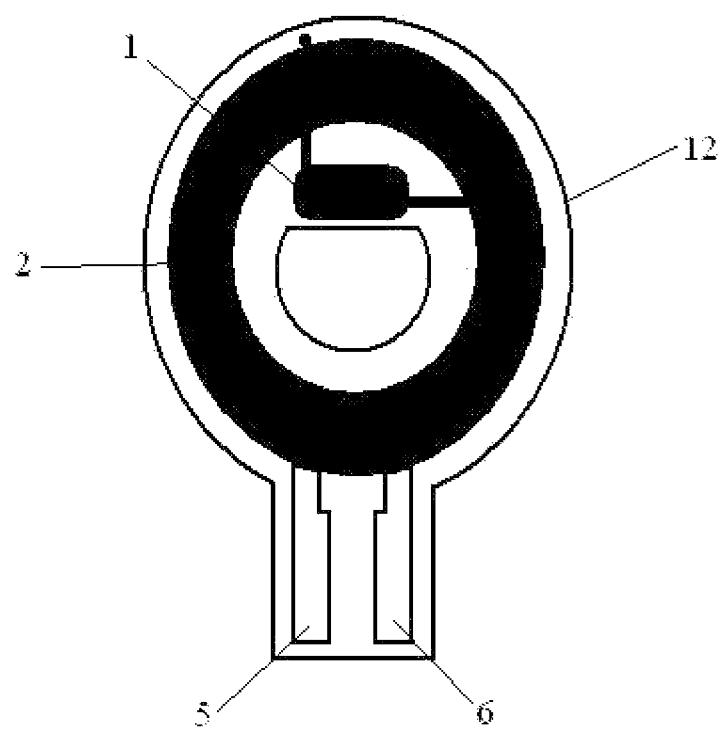
FIG. 4 shows an embodiment of an electronic module.

The sealing element 4 can be of any length, but must still match, within a certain range, the inductivity and self-resonant frequency of the electronics circuits when the sealing element 4 is connected on both extremities of the partial antenna 2. The length can be adapted when it will be applied to the item, which gives much more flexibility compare to other type of invention for similar functions. The device according to the invention can be of any size or any shape (see e.g. FIG. 4 showing an oval electronic module), reasonably from a diameter of 5 mm to 500 mm, using a RFID technology from 100 kHz up to 950 MHz, typically 125 kHz, 134.2 kHz, 13.56 MHz, with a read only or read/write RFID IC. The device can also have a tube shape and can contain a ferrite antenna. In this case, the device can be as small as 2.12 mm×8 mm.

The antenna can be made with any technology such as winding, etching, stamping or printing.

The sealing element 4 has a positive effect on the reading performance of the device itself. Since there is a bigger loop made with the sealing (conductive) element 4 connected to the housing 3, the reading/writing performance improves because the loop increases the equivalent surface area of the housing crossed by the magnetic filed generated from the RFID reader.

What is claimed is:

1. A security sealing device comprising a sealing element, an integrated circuit and an antenna connected to said integrated circuit, said integrated circuit and said antenna forming a Radio Frequency Identification (RFID) circuit, wherein the device comprises a housing containing said integrated circuit and a portion of the antenna forming a partial antenna, that said sealing element is conductive and is connected to said partial antenna and forming a part of said antenna and that at least a part of said sealing element extends outside of said housing, wherein said partial antenna is made of a conductive path with two free ends forming respectively a first and a second connecting point, said sealing element furthermore comprising a first and a second end, each of said first and second end being adapted to be directly or indirectly connected to one respective connecting point.

2. The security sealing device according to claim 1 further comprising a connector that connects one connecting point to one end of the sealing element.

3. The security sealing device according to claim 2 wherein said connector is permanently attached to said housing.

4. The security sealing device according to claim 2 wherein said connector is permanently attached to said sealing element.

5. The security sealing device according to claim 2 wherein said connector includes elements acting as mechanical tamper-evident and/or locking system.

6. The security sealing device according to claim 2 further comprising a second connector adapted for connecting the other connecting point to the other end of the sealing element.

7. The security sealing device according to claim 1 wherein said sealing element includes visible tamper-evident elements.

8. The security sealing device according to claim 1 wherein said housing includes visible tamper-evident elements.

9. The security sealing device according to claim 1 wherein one connecting point is permanently and directly fixed to said sealing element.

10. The security sealing device according to claim 1 further comprising another RFID circuit.

11. The security sealing device according to claim 10 wherein said other RFID circuit is adapted to not lose its functionality when the sealing element is broken or separated from the housing.

12. The security sealing device according to claim 1 wherein said sealing element has a length between 1 cm and 5 m.

13. The security sealing device according to claim 1 wherein said electronic module is sealed in a plastic housing, between a diameter of 5 mm to 500 mm, using RFID technology from 100 kHz up to 950 MHz, with a read only or read/write RFID Integrated Circuit (IC).

\* \* \* \* \*